(12) United States Patent
McMillian

(10) Patent No.: US 12,212,127 B2
(45) Date of Patent: Jan. 28, 2025

(54) RIGHT ANGLE ADAPTER ASSEMBLY

(71) Applicant: Kyemba McMillian, Dallas, TX (US)

(72) Inventor: Kyemba McMillian, Dallas, TX (US)

( * ) Notice: Subject to any disclaimer, the term of this patent is extended or adjusted under 35 U.S.C. 154(b) by 511 days.

(21) Appl. No.: 17/584,794

(22) Filed: Jan. 26, 2022

(65) Prior Publication Data

US 2023/0238786 A1 Jul. 27, 2023

(51) Int. Cl.
| | |
|---|---|
| *H02G 3/06* | (2006.01) |
| *G03B 17/56* | (2021.01) |
| *G08B 13/196* | (2006.01) |
| *H02B 1/20* | (2006.01) |
| *H02B 1/26* | (2006.01) |

(52) U.S. Cl.
CPC ........... *H02G 3/0608* (2013.01); *H02B 1/202* (2013.01); *H02B 1/26* (2013.01)

(58) Field of Classification Search
CPC .......... H02G 3/0608; H02G 3/06; H02G 3/08; H02G 3/10; H02B 1/202; H02B 1/26; G03B 17/561; G08B 13/19632; H05K 5/0204; H05K 5/0247
See application file for complete search history.

(56) References Cited

U.S. PATENT DOCUMENTS

| | | |
|---|---|---|
| 5,700,977 A | 12/1997 | Ford |
| 9,134,015 B2 | 9/2015 | Guercio |
| D864,877 S | 10/2019 | Danesh |
| 10,574,044 B2 | 2/2020 | Zbriger |
| 10,847,958 B1 | 11/2020 | Reed |
| 10,907,806 B2 | 2/2021 | Behnke |
| 10,928,203 B2 | 2/2021 | Mires |
| 2004/0057717 A1* | 3/2004 | Arbuckle ......... G08B 13/19632 396/427 |
| 2005/0241846 A1 | 11/2005 | Finn, II |
| 2021/0278037 A1* | 9/2021 | Boyes .................... F16M 13/02 |
| 2022/0149606 A1* | 5/2022 | Wan ....................... H04N 23/51 |

FOREIGN PATENT DOCUMENTS

WO WO2016081414 5/2016

* cited by examiner

*Primary Examiner* — Hoa C Nguyen
*Assistant Examiner* — Amol H Patel

(57) ABSTRACT

A right angle adapter assembly for mounting a surveillance camera to an eave includes a junction box that has an open end and an exit. The open end is positionable against an eave of a roof to insertably receive electrical wiring. A coupling pipe removably engages the exit in the junction box. A mounting disk is provided that has a mounting face and the mounting disk is attachable to the coupling pipe having the mounting face lying on a horizontal plane. In this way a surveillance camera can be mounted to the mounting face thereby facilitating the surveillance camera to be mounted to the eave of the roof according to manufacturer's recommendations.

7 Claims, 5 Drawing Sheets

RIGHT ANGLE ADAPTER ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to angle adapter devices and more particularly pertains to a new angle adapter device for mounting a surveillance camera to an eave. The device includes a junction box that is mountable to an eave of a roof and a coupling pipe that engages the junction box. The device includes a mounting disk which engages the coupling pipe such that a mounting face of the mounting disk lies on a horizontal plane. In this way a surveillance camera can be mounted to the mounting face in accordance to manufacturer's recommendations.

(2) Description of Related Art Including Information Disclosed Under 37 CFR 1.97 and 1.98

The prior art relates to angle adapter devices including right angle junction box that comprises a first shell that attaches to a second shell to define a junction box. The prior art discloses a variety of angled adapters that comprise a junction box with an angled face. The prior art discloses a ninety degree elbow device for routing electrical cables. The prior art discloses a variety of light fixtures that are mountable to a ceiling and which has a right angle entry for electrical wiring.

BRIEF SUMMARY OF THE INVENTION

An embodiment of the disclosure meets the needs presented above by generally comprising a junction box that has an open end and an exit. The open end is positionable against an eave of a roof to insertably receive electrical wiring. A coupling pipe removably engaging the exit in the junction box. A mounting disk is provided that has a mounting face and the mounting disk is attachable to the coupling pipe having the mounting face lying on a horizontal plane. In this way a surveillance camera can be mounted to the mounting face thereby facilitating the surveillance camera to be mounted to the eave of the roof according to manufacturer's recommendations.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
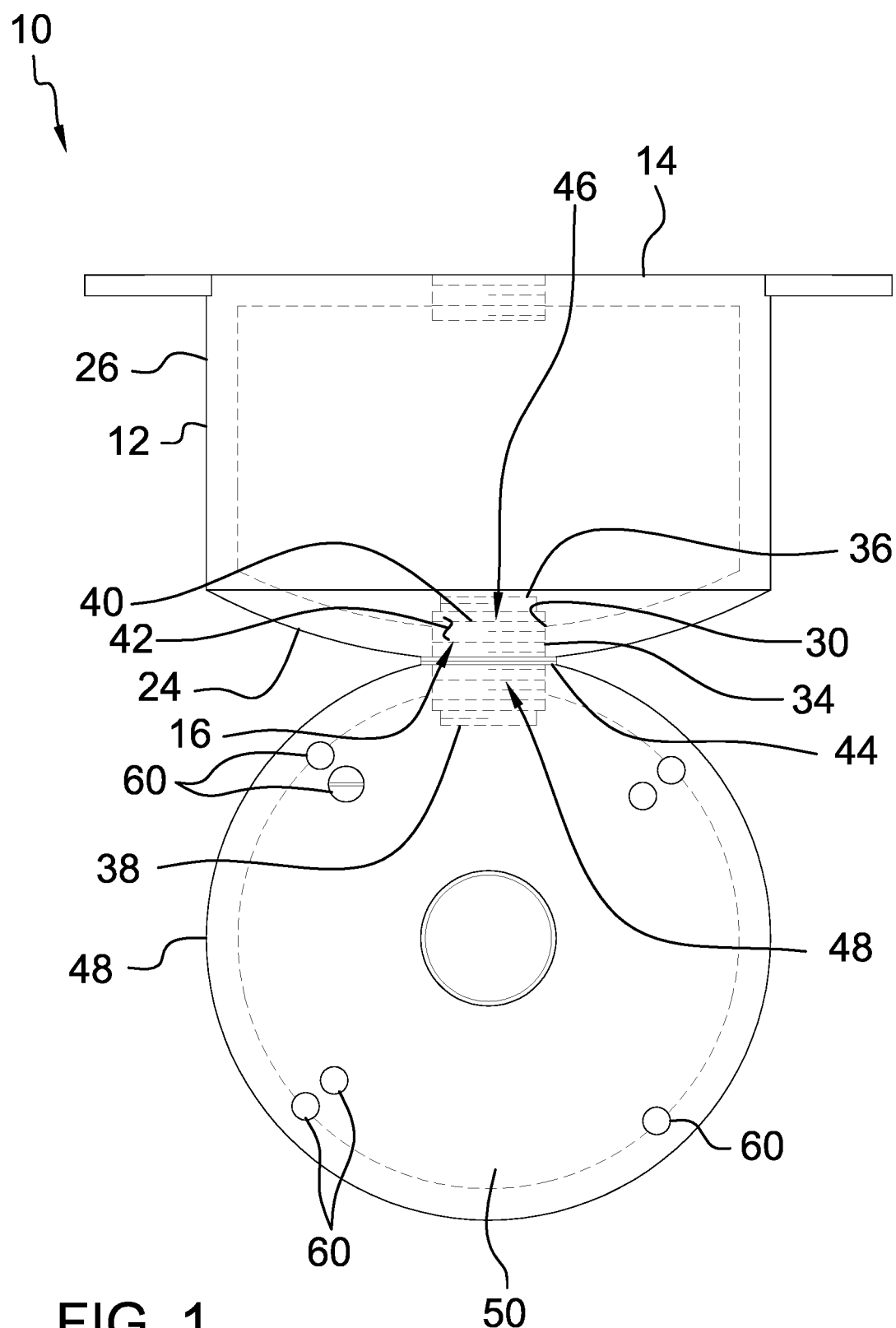
FIG. 1 is a front phantom view of a right angle adapter assembly according to an embodiment of the disclosure.
Figure 2:
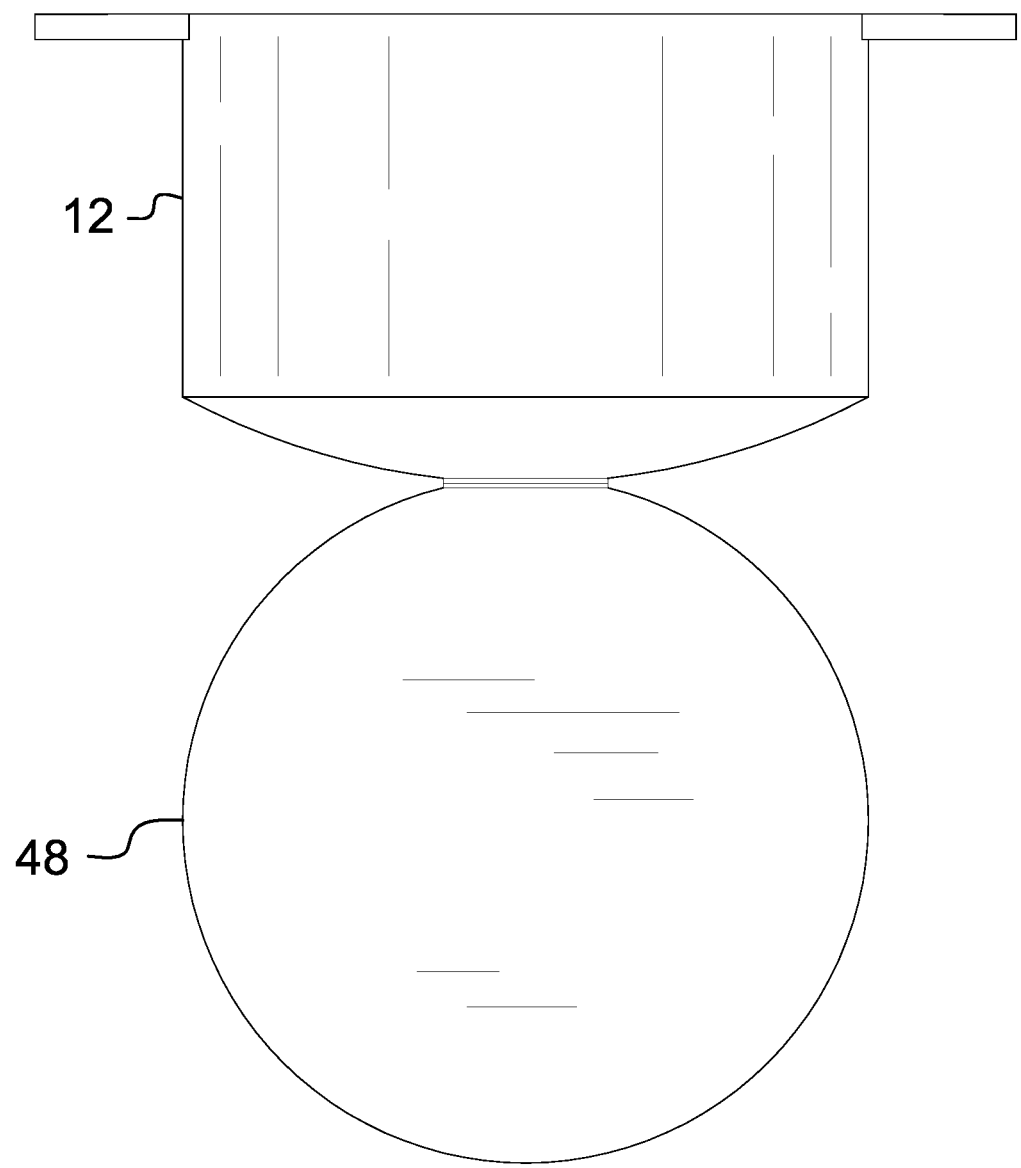
FIG. 2 is a back view of an embodiment of the disclosure.
Figure 3:
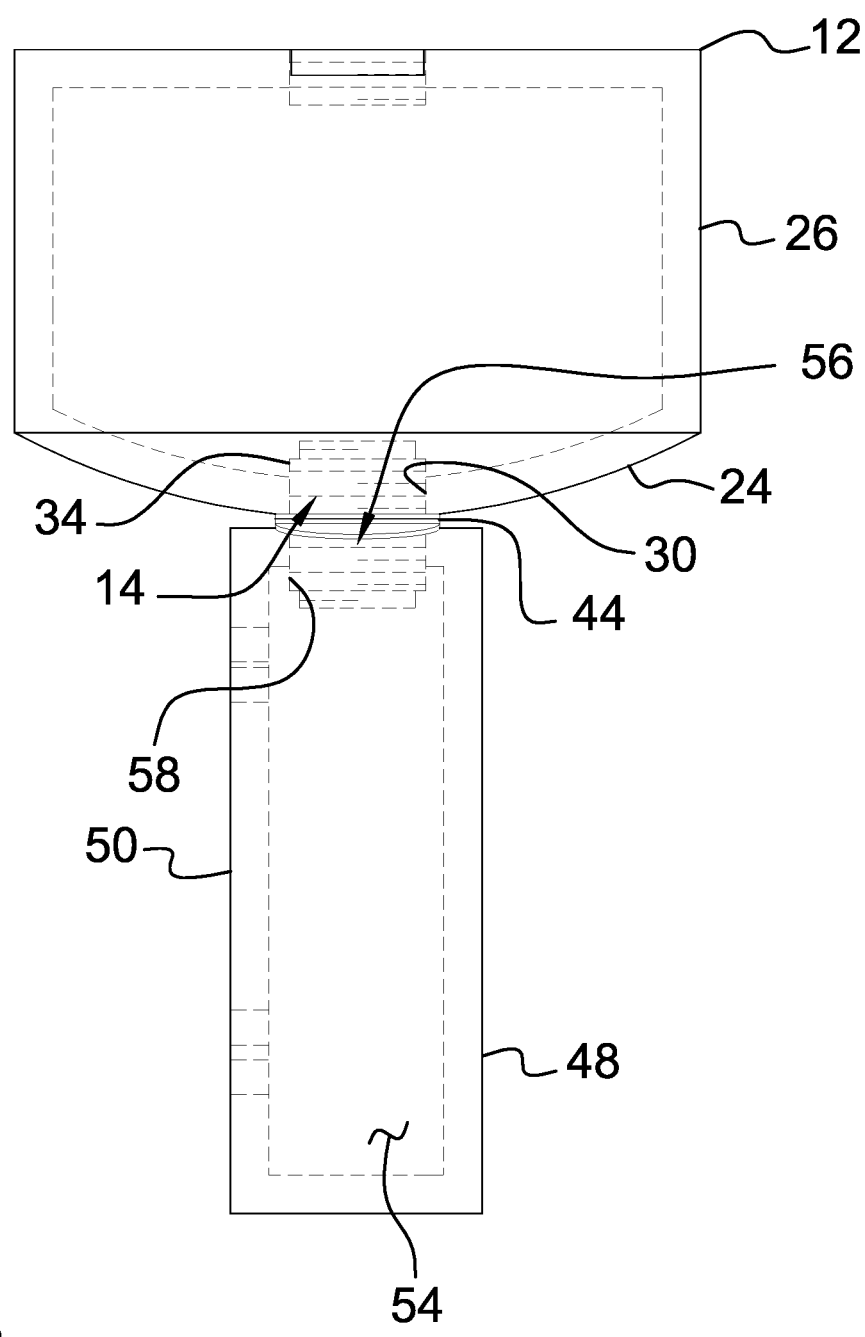
FIG. 3 is a left side phantom view of an embodiment of the disclosure.
Figure 4:
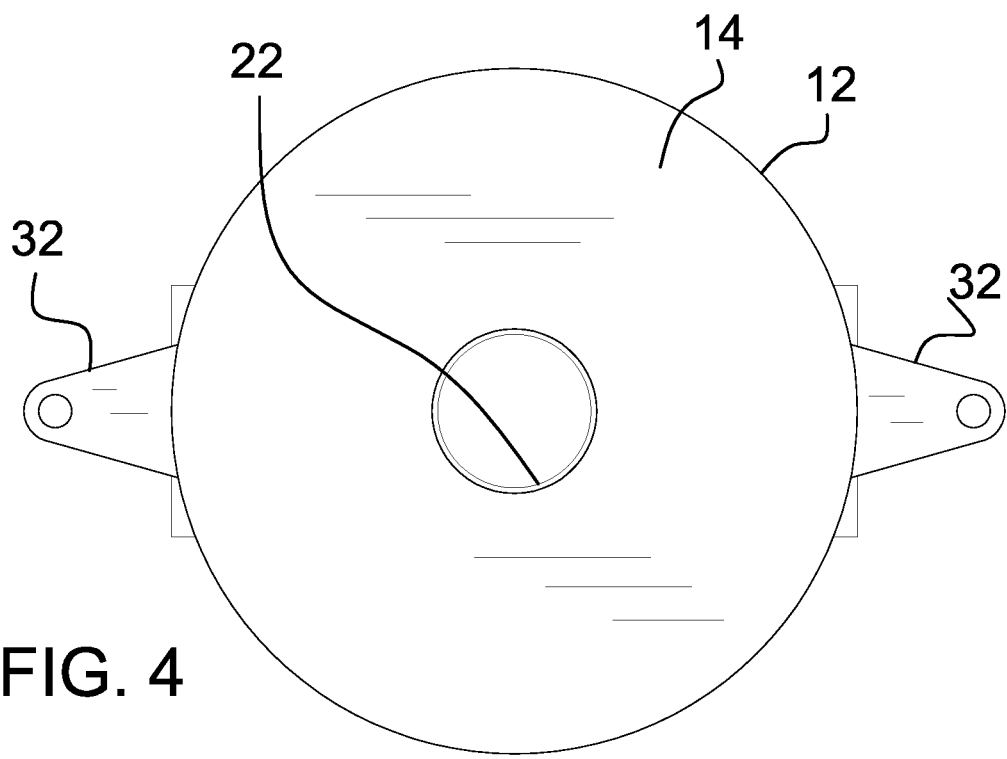
FIG. 4 is a top view of an embodiment of the disclosure.
Figure 5:
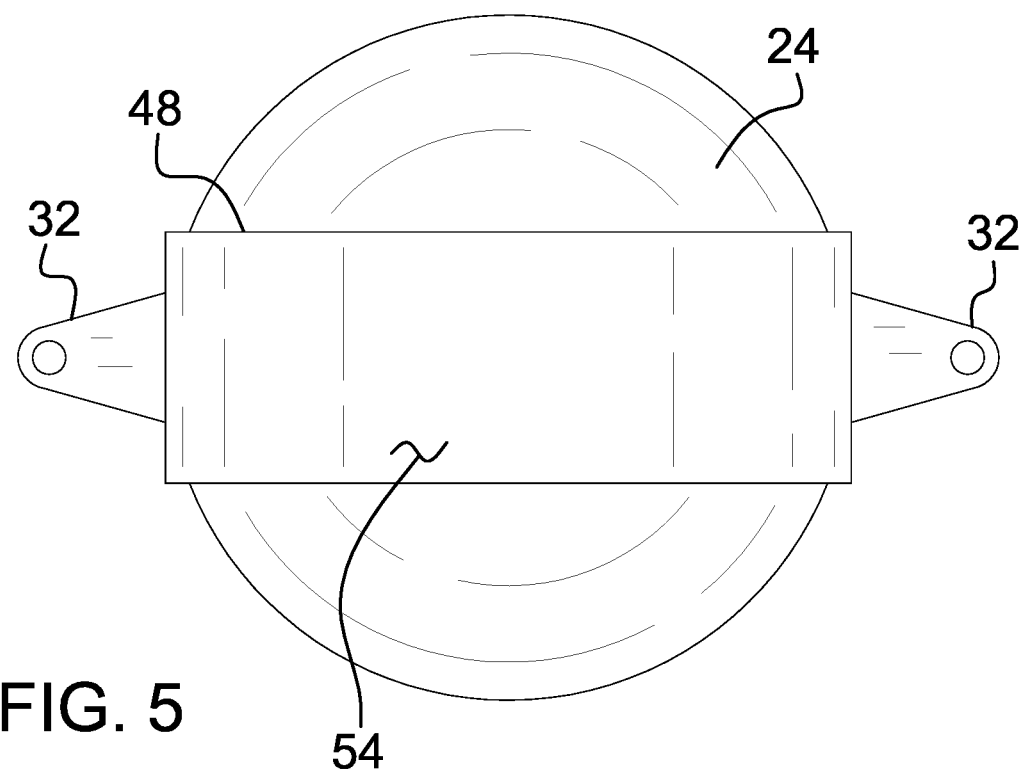
FIG. 5 is a bottom view of an embodiment of the disclosure.
Figure 6:
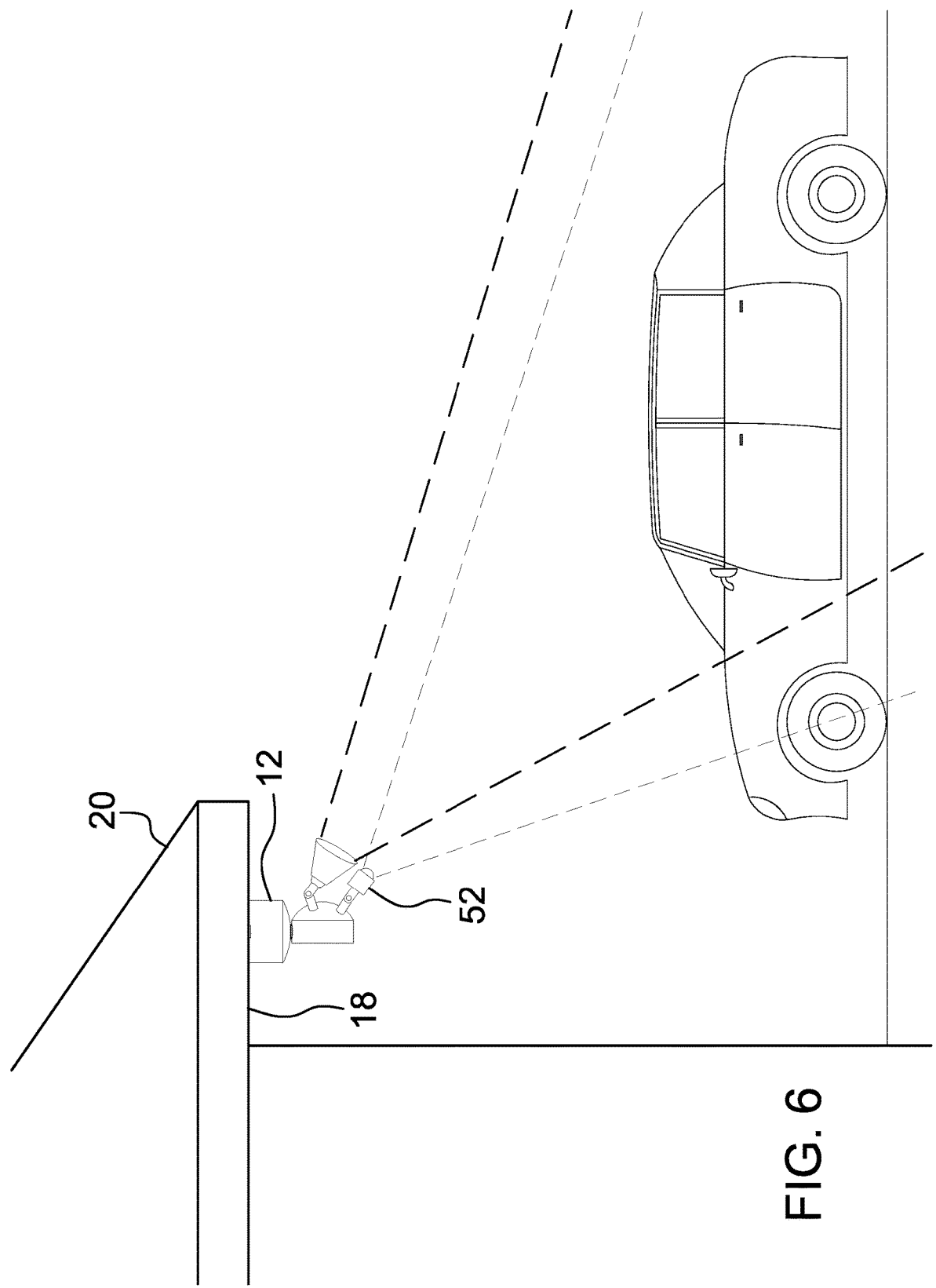
FIG. 6 is a perspective in-use view of an embodiment of the disclosure.

With reference now to the drawings, and in particular to FIGS. 1 through 6 thereof, a new angle adapter device embodying the principles and concepts of an embodiment of the disclosure and generally designated by the reference numeral 10 will be described.

As best illustrated in FIGS. 1 through 6, the right angle adapter assembly 10 generally comprises a junction box 12 that has an open end 14 and an exit 16. The open end 14 is positionable against an eave 18 of a roof 20 to insertably receive electrical wiring 22. The roof 20 may be a roof of a house or other type of occupancy and the electrical wiring 22 may be wiring of an electrical system of the house. The junction box 12 has a lower wall 24 and an outer wall 26 extending away from the lower wall 24, and the outer wall 26 is continuously arcuate about a center of the lower wall 24 such that the junction box 12 has a cylindrical shape. The outer wall 26 has a distal edge 28 with respect to the lower wall 24 defining the open end 14.

The lower wall 24 is convexly arcuate with respect to the outer wall 26 and the exit 16 extends through the lower wall 24. The exit 16 is centrally positioned on the lower wall 24, the exit 16 has a bounding edge 30 and the bounding edge 30 is threaded. The junction box 12 has a pair of mounting feet 32 extending away from the outer wall 26. Each of the mounting feet 32 is aligned with the distal edge 28 of the outer wall 26 and the mounting feet 32 is positioned on opposite sides of the outer wall 26 from each other.

A coupling pipe 34 removably engages the exit 16 in the junction box 12 and the coupling pipe 34 is hollow to facilitate the electrical wiring 22 to pass through the coupling pipe 34. The coupling pipe 34 has a first end 36, a second end 38 and an outside wall 40 extending between the first end 36 and the second end 38, and each of the first end 36 and the second end 38 is open. The outside wall 40 has an outer surface 42 and the outer surface 42 is threaded. A flange 44 extends outwardly from the outer surface 42 and the flange 44 extends around an entire circumference of the outer surface 42. The flange 44 is centrally positioned between the first end 36 and the second end 38 to define a first portion 46 of the outer surface 42 and a second portion 47 of the outer surface 42. The first portion 46 threadably engages the bounding surface 30 of the exit 16 having the flange 44 abutting the lower wall 24 of the junction box 12 when the coupling pipe 34 is coupled to the junction box 12.

A mounting disk 48 is provided which has a mounting face 50 and the mounting disk 48 is attachable to the coupling pipe 34 having the mounting face 50 lying on a horizontal plane. In this way the mounting face 50 facilitates a surveillance camera 52 to be mounted to the mounting face 50. Thus, the surveillance camera 52 can be mounted to the eave 18 of the roof 20 according to manufacturer's recommendations. The mounting disk 48 has a perimeter surface 54 and the perimeter surface 54 has a hole 56 extending into an interior of the mounting disk 48. The hole 56 has a bounding edge 58 and the bounding edge 58 of the hole 56 is threaded.

The second portion 47 of the outer surface 42 of the coupling pipe 34 threadably engages the bounding edge 30 of the hole 56 having the flange 44 on the outer surface 42 abutting the perimeter surface 54. In this way the coupling pipe 34 can route the electrical wiring 22 into the mounting disk 48. The mounting face 50 has a plurality of screw holes 60 each extending into the interior of the mounting disk 48. The screw holes 60 are spaced apart from each other and are strategically positioned for accommodating mounting screws of the surveillance camera 52.

In use, the junction box 12 is mounted to the eave 18 of the roof 20 and the electrical wiring 22 is routed into the junction box 12 and into the mounting disk 48. The surveillance camera 52 is mounted to the mounting face 50 of the mounting disk 48. In this way the surveillance camera 52 can be mounted on a horizontal surface in accordance to the manufacturer's recommendations. Furthermore, the mounting disk 48 can be rotated on the coupling pipe 34 in order to direct the surveillance camera 52 in a preferred direction.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A right angle adapter assembly for mounting a camera beneath an eave of a roof, said assembly comprising:
    a junction box having an open end and an exit, said open end being positionable against an eave of a roof wherein said junction box is configured to insertably receive electrical wiring;
    a coupling pipe removably engaging said exit in said junction box, said coupling pipe being hollow wherein said coupling pipe is configured to facilitate the electrical wiring to pass through said coupling pipe;
    a mounting disk having a mounting face, said mounting disk being attachable to said coupling pipe having said mounting face lying on a horizontal plane wherein said mounting face is configured to have a surveillance camera being mounted to said mounting face thereby facilitating the surveillance camera to be mounted to the eave of the roof;
    wherein said junction box has a lower wall and an outer wall extending away from said lower wall, said outer wall being continuously arcuate about a center of said lower wall such that said junction box has a cylindrical shape, said outer wall having a distal edge with respect to said lower wall defining said open end, said lower wall being convexly arcuate with respect to said outer wall;
    wherein said exit extends through said lower wall, said exit being centrally positioned on said lower wall, said exit having a bounding edge, said bounding edge being threaded; and
    wherein said junction box has a pair of mounting feet extending away from said outer wall, each of said mounting feet being aligned with said distal edge of said outer wall, said mounting feet being positioned on opposite sides of said outer wall from each other.

2. The assembly according to claim 1, wherein;
    said coupling pipe has a first end, a second end and an outside wall extending between said first end and said second end, each of said first end and said second end being open, said outside wall having an outer surface, said outer surface being threaded; and
    said coupling pipe has a flange extending outwardly from said outer surface, said flange extending around an entire circumference of said outer surface, said flange being centrally positioned between said first end and said second end to define a first portion of said outer surface and a second portion of said outer surface.

3. The assembly according to claim 2, wherein said first portion threadably engages said bounding surface of said exit having said flange abutting said lower wall of said junction box when said coupling pipe is couped to said junction box.

4. The assembly according to claim 2, wherein said mounting disk has a perimeter surface, said perimeter surface having a hole extending into an interior of said mounting disk, said hole having a bounding edge, said bounding edge of said hole being threaded, said second portion of said outer surface of said coupling pipe threadably engaging said bounding edge of said hole having said flange on said outer surface abutting said perimeter surface wherein said coupling pipe is configured to route the electrical wiring into said mounting disk.

5. The assembly according to claim 1, wherein said mounting face has a plurality of screw holes each extending into said interior of said mounting disk, said screw holes being spaced apart from each other and being strategically positioned for accommodating mounting screws of the surveillance camera.

6. A right angle adapter assembly for mounting a camera beneath an eave of a roof, said assembly comprising:
- a junction box having an open end and an exit, said open end being positionable against an eave of a roof wherein said junction box is configured to insertably receive electrical wiring, said junction box having a lower wall and an outer wall extending away from said lower wall, said outer wall being continuously arcuate about a center of said lower wall such that said junction box has a cylindrical shape, said outer wall having a distal edge with respect to said lower wall defining said open end, said lower wall being convexly arcuate with respect to said outer wall, said exit extending through said lower wall, said exit being centrally positioned on said lower wall, said exit having a bounding edge, said bounding edge being threaded, said junction box having a pair of mounting feet extending away from said outer wall, each of said mounting feet being aligned with said distal edge of said outer wall, said mounting feet being positioned on opposite sides of said outer wall from each other;
- a coupling pipe removably engaging said exit in said junction box, said coupling pipe being hollow wherein said coupling pipe is configured to facilitate the electrical wiring to pass through said coupling pipe, said coupling pipe having a first end, a second end and an outside wall extending between said first end and said second end, each of said first end and said second end being open, said outside wall having an outer surface, said outer surface being threaded, said coupling pipe having a flange extending outwardly from said outer surface, said flange extending around an entire circumference of said outer surface, said flange being centrally positioned between said first end and said second end to define a first portion of said outer surface and a second portion of said outer surface, said first portion threadably engaging said bounding surface of said exit having said flange abutting said lower wall of said junction box when said coupling pipe is couped to said junction box; and
- a mounting disk having a mounting face, said mounting disk being attachable to said coupling pipe having said mounting face lying on a horizontal plane wherein said mounting face is configured to have a surveillance camera being mounted to said mounting face thereby facilitating the surveillance camera to be mounted to the eave of the roof, said mounting disk having a perimeter surface, said perimeter surface having a hole extending into an interior of said mounting disk, said hole having a bounding edge, said bounding edge of said hole being threaded, said second portion of said outer surface of said coupling pipe threadably engaging said bounding edge of said hole having said flange on said outer surface abutting said perimeter surface wherein said coupling pipe is configured to route the electrical wiring into said mounting disk, said mounting face having a plurality of screw holes each extending into said interior of said mounting disk, said screw holes being spaced apart from each other and being strategically positioned for accommodating mounting screws of the surveillance camera.

7. A right angle adapter system for mounting a camera beneath an eave of a roof, said system comprising:
- a surveillance camera having
- a junction box having an open end and an exit, said open end being positionable against an eave of a roof wherein said junction box is configured to insertably receive electrical wiring, said junction box having a lower wall and an outer wall extending away from said lower wall, said outer wall being continuously arcuate about a center of said lower wall such that said junction box has a cylindrical shape, said outer wall having a distal edge with respect to said lower wall defining said open end, said lower wall being convexly arcuate with respect to said outer wall, said exit extending through said lower wall, said exit being centrally positioned on said lower wall, said exit having a bounding edge, said bounding edge being threaded, said junction box having a pair of mounting feet extending away from said outer wall, each of said mounting feet being aligned with said distal edge of said outer wall, said mounting feet being positioned on opposite sides of said outer wall from each other;
- a coupling pipe removably engaging said exit in said junction box, said coupling pipe being hollow wherein said coupling pipe is configured to facilitate the electrical wiring to pass through said coupling pipe, said coupling pipe having a first end, a second end and an outside wall extending between said first end and said second end, each of said first end and said second end being open, said outside wall having an outer surface, said outer surface being threaded, said coupling pipe having a flange extending outwardly from said outer surface, said flange extending around an entire circumference of said outer surface, said flange being centrally positioned between said first end and said second end to define a first portion of said outer surface and a second portion of said outer surface, said first portion threadably engaging said bounding surface of said exit having said flange abutting said lower wall of said junction box when said coupling pipe is couped to said junction box; and
- a mounting disk having a mounting face, said mounting disk being attachable to said coupling pipe having said mounting face lying on a horizontal plane wherein said mounting face is configured to have a surveillance camera being mounted to said mounting face thereby facilitating the surveillance camera to be mounted to the eave of the roof, said mounting disk having a perimeter surface, said perimeter surface having a hole extending into an interior of said mounting disk, said hole having a bounding edge, said bounding edge of said hole being threaded, said second portion of said outer surface of said coupling pipe threadably engaging said bounding edge of said hole having said flange on said outer surface abutting said perimeter surface wherein said coupling pipe is configured to route the electrical wiring into said mounting disk, said mounting face having a plurality of screw holes each extending into said interior of said mounting disk, said screw holes being spaced apart from each other and being strategically positioned for accommodating mounting screws of the surveillance camera.

\* \* \* \* \*